(12) United States Patent
Busayarat et al.

(10) Patent No.: US 10,540,364 B2
(45) Date of Patent: Jan. 21, 2020

(54) DATA DELIVERY ARCHITECTURE FOR TRANSFORMING CLIENT RESPONSE DATA

(71) Applicant: Home Box Office, Inc., New York, NY (US)

(72) Inventors: Sata Busayarat, Seattle, WA (US); Brandon C. Furtwangler, Issaquah, WA (US); Allen Arthur Gay, Shoreline, WA (US); Jonathan David Lutz, Seattle, WA (US); Steven N. Furtwangler, Okemos, MI (US)

(73) Assignee: Home Box Office, Inc., New York, NY (US)

( * ) Notice: Subject to any disclaimer, the term of this patent is extended or adjusted under 35 U.S.C. 154(b) by 317 days.

(21) Appl. No.: 15/584,134

(22) Filed: May 2, 2017

(65) Prior Publication Data

US 2018/0322176 A1    Nov. 8, 2018

(51) Int. Cl.
*G06F 16/00* (2019.01)
*G06F 16/25* (2019.01)
(Continued)

(52) U.S. Cl.
CPC .......... *G06F 16/254* (2019.01); *G06F 16/168* (2019.01); *G06F 16/9024* (2019.01)

(58) Field of Classification Search
CPC .. G06F 16/254; G06F 16/738; G06F 16/9024; G06F 16/168; G06F 16/80;
(Continued)

(56) References Cited

U.S. PATENT DOCUMENTS 10,243,792 B1 * 3/2019 Kaukl ................... H04L 67/306
2003/0110297 A1 6/2003 Tabatabai et al.
(Continued)

FOREIGN PATENT DOCUMENTS

EP    2 755 148 A1    7/2014
WO   02/100117 A2   12/2002

OTHER PUBLICATIONS

Non-Final Office Action received for U.S. Appl. No. 15/449,264 dated Dec. 27, 2018, 43 pages.
(Continued)

*Primary Examiner* — Anh Ly
(74) *Attorney, Agent, or Firm* — Amin, Turocy & Watson, LLP

(57) ABSTRACT

The described technology is directed towards a data transformation pipeline architecture of a data service that processes generalized datasets into datasets (e.g., video data or graph nodes) customized for a particular client device. Described herein is maintaining a set of data transformation models at a data service, and upon receiving a client request for data, selecting a relevant subset of the transformation models and arranging the subset into a data transformation pipeline. In general, the pipeline of transformation models transforms the generalized data into the format and shape that each client device expects. The subset may be selected based upon device type, device class and/or software version information (and possibly state data) sent with each data request. The transformation models may be maintained in a hierarchical data store such as files in a file system to facilitate retrieval by searching the hierarchy for appropriate transformation models.

20 Claims, 11 Drawing Sheets

(51) Int. Cl.
*G06F 16/16* (2019.01)
*G06F 16/901* (2019.01)

(58) Field of Classification Search
CPC .. G06F 16/2457; G06F 16/285; G06F 16/278; G06F 16/51; G06F 9/5077; G06F 9/5005; G06F 16/00; G06F 17/30; G06F 16/338; G06F 16/961; G06F 17/30696; G06F 17/30864; G06F 17/60563; G06F 17/30126; G06F 17/30958; H04L 65/604; H04L 12/4068; G06Q 50/18; G06T 11/206; H04N 21/4355
See application file for complete search history.

(56) References Cited

U.S. PATENT DOCUMENTS

| | | | |
|---|---|---|---|
| 2004/0268244 A1* | 12/2004 | Levanoni | G06F 16/9574 715/210 |
| 2006/0129524 A1* | 6/2006 | Levanoni | G06F 16/9574 707/E17.12 |
| 2008/0040450 A1 | 2/2008 | Appleyard et al. | |
| 2009/0083289 A1 | 3/2009 | Morris | |
| 2010/0069035 A1* | 3/2010 | Johnson | H04W 4/02 455/404.1 |
| 2010/0083277 A1* | 4/2010 | Malladi | G06F 9/541 719/313 |
| 2010/0100952 A1* | 4/2010 | Sample | H04L 51/066 709/223 |
| 2010/0177929 A1* | 7/2010 | Kurtz | G06K 9/00228 382/103 |
| 2010/0250773 A1 | 9/2010 | Mao | |
| 2011/0066676 A1 | 3/2011 | Kleyzit et al. | |
| 2011/0238780 A1 | 9/2011 | Neitzel et al. | |
| 2013/0187926 A1* | 7/2013 | Silverstein | G06Q 10/105 345/440 |
| 2013/0335627 A1 | 12/2013 | Larsson et al. | |
| 2014/0208332 A1* | 7/2014 | Malladi | G06F 9/541 719/313 |
| 2014/0229818 A1 | 8/2014 | Goswami | |
| 2015/0015593 A1* | 1/2015 | Chalfin | G06T 1/20 345/522 |
| 2015/0372807 A1* | 12/2015 | Khoyi | G06F 16/116 713/150 |
| 2016/0041952 A1* | 2/2016 | Malladi | G06F 9/541 715/239 |
| 2016/0086260 A1* | 3/2016 | Vermeulen | G06Q 40/00 705/35 |
| 2016/0171121 A1 | 6/2016 | Hu et al. | |
| 2016/0232457 A1* | 8/2016 | Gray | G06T 11/206 |
| 2016/0253382 A1 | 9/2016 | Shadmon | |
| 2017/0060562 A1 | 3/2017 | Lopez et al. | |
| 2017/0091673 A1* | 3/2017 | Gupta | G06N 5/022 |
| 2017/0220403 A1* | 8/2017 | Maag | G06F 11/3692 |

OTHER PUBLICATIONS

Pitts, Robert I., "Graph—Linked Implementation", URL: https://www.cs.bu.edn/teaching/c/graph/linked, 2000, 11 pages.
Invitation to Pay Additional Fees and, Where Applicable, Protest Fee and Communication Relating to the Results of the Partial International Search received for PCT Application Serial No. PCT/US2018/020631 dated May 3, 2018, 14 pages.
International Search Report and Written Opinion received for PCT Application Serial No. PCT/US2018/020631 dated Aug. 20, 2018, 20 pages.
International Search Report and Written Opinion received for PCT Application Serial No. PCT/US2018/030716 dated Jul. 16, 2018, 11 pages.
Final Office Action received for U.S. Appl. No. 15/449,264 dated May 1, 2019, 31 pages.

\* cited by examiner

DATA DELIVERY ARCHITECTURE FOR TRANSFORMING CLIENT RESPONSE DATA

BACKGROUND

Media content such as streamed video (including accompanying audio) is now able to be played on various types of client devices including smartphones, tablets, personal computers, large screen televisions and so forth. These device types sometimes can be grouped into classes of client devices, such as classes based on approximately how far typical users will be from the screen when viewing (e.g., "onefoot" device classes, "threefoot" device classes and "tenfoot" device classes).

The user interfaces that allow a video content offering such as a movie or television show episode to be selected for viewing, may need to be somewhat customized for each device or device class. For example, a content provider generally wants to give the user a desirable user experience when interacting to select from among its content offerings. Thus, a device in the "onefoot" device class may be given interactive icons or the like that are appropriately sized and positioned for such a device class, as opposed to the icons' sizing and positioning on a device in the "tenfoot" device class. Somewhat similarly, the video codecs/or and containers for streamed video can be specific to each device or device class; e.g., older devices may not support newer standards.

As new devices get introduced into the marketplace, various versions of software code are provided to support such devices, including the APIs and other mechanisms that such devices use to exchange data with a data service of the content provider. Similarly, software versions change for other reasons, such as when new data properties are introduced, or when others become obsolete or irrelevant, as well as to fix discovered bugs.

One solution to providing data to the various devices is for a data service to maintain and support different code bases and datasets for each such device, device class and/or software version as needed. When a client connects, the data service matches that client to a suitable code base and dataset, e.g., via a load balancer or the like that routes different clients to different servers. However this solution becomes a complex task as soon as more than just a small number of distinctions among devices and software versions need to be supported.

In some instances, it is also feasible to send the same data to each client device, and have complex client software on each device customize the data as needed for that client device. However, developing, maintaining and supporting such complex client software is also an extremely difficult problem, and is likely unworkable on low-powered devices that cannot process the data fast enough and/or do not have sufficient memory to make such customizations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards a data transformation pipeline that processes generalized data into data customized for a client device. One or more aspects are directed towards receiving a client request for a requested data item, in which the data item has an associated type and the client request is associated with client-specific information. Described herein is obtaining a transformation pipeline for the data type, in which the transformation pipeline contains one or more transformation models that correspond to the client-specific information. Upon obtaining the data item having data in a generalized form, further described herein is processing the data item through the transformation pipeline to obtain transformed data and returning the transformed data in response in response to the client request Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
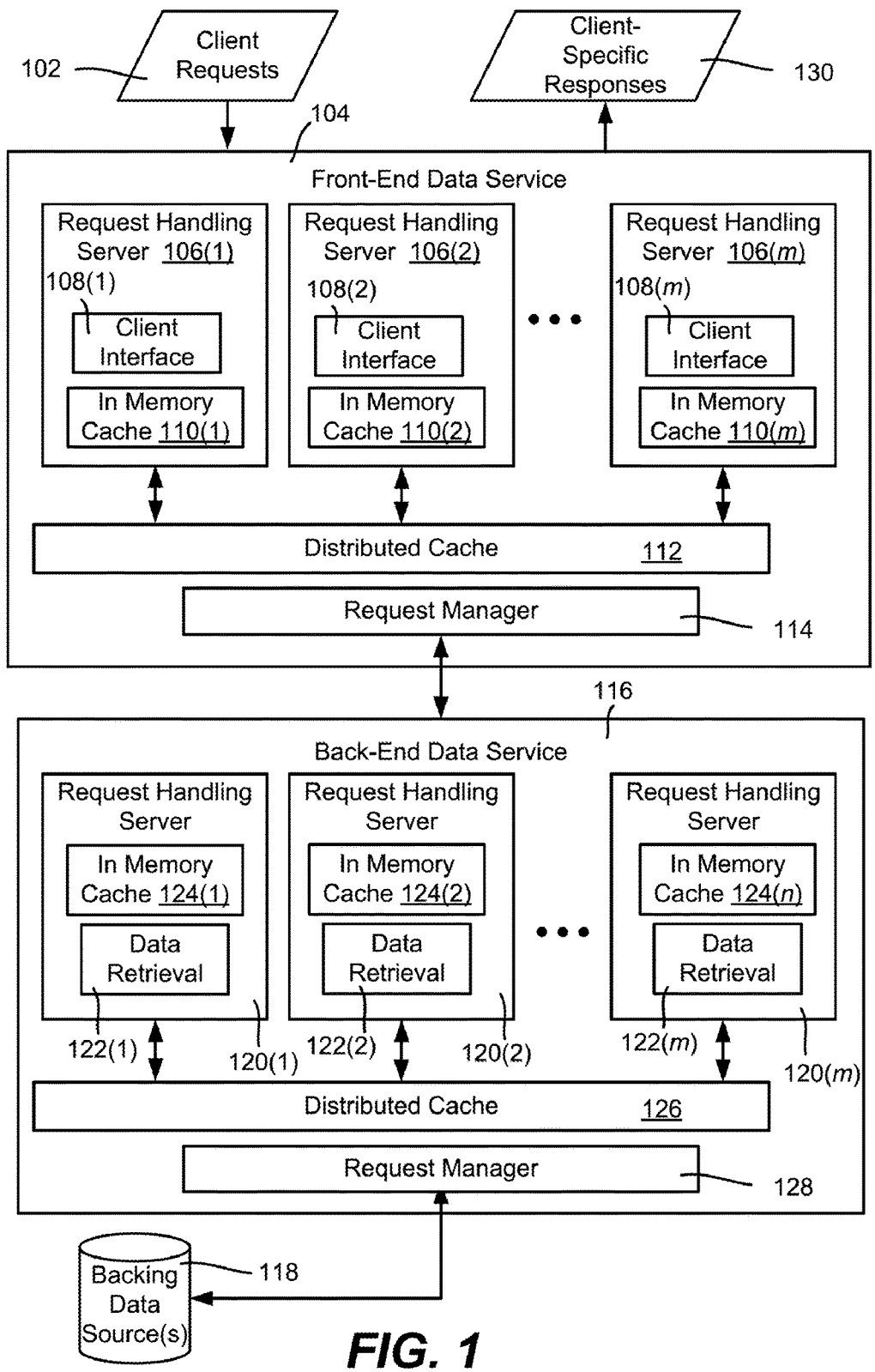
FIG. 1 is an example block diagram representation of components that handle requests for data to return client-specific responses, according to one or more example implementations.

Various aspects of the technology described herein are generally directed towards a data delivery architecture that transforms data maintained in a generalized format into transformed data that is customized for a requesting client entity. The data transformation is based upon client-specific information for the requested type of data. Note that "client-specific" as used herein may refer to any individual client device, however "client-specific" typically refers to groups of client devices in which each group's devices share the same properties as other client devices of the group; for example, a client-specific group typically has client devices of the same device type (and/or class), which are each running the same version of the client software platform/program that interfaces with the data service. State data also may be used to determine a group's devices, e.g., devices that otherwise share the same properties may be in one group in one state (devices with logged-in client users), and another group in another state (devices without logged-in client users).

Thus, in one or more implementations of the data delivery architecture, for each client device type and/or device class, and/or software version, as provided by the client with each request for data, a client-specific set of data transformation models are selected from a library of such models, and arranged in a transformation pipeline configuration. As described above, one or more additional selection criteria may be used for selecting one pipeline instance/model over another for a request, including user state; (e.g., when a user is signed in one pipeline instance with one type of transformation model is selected versus pipeline instance with another type of transformation model when a user is not signed in).

In general, each transformation model performs one data transformation operation on a dataset input to the model, with the next model inputting that previous model's transformed dataset and further transforming it, and so on. For example, for a set of models selected as a pipeline instance for a client entity, one transformation model transforms information in an input dataset into a client's ID namespace; a subsequent transformation model may filter some of the dataset's data, and another subsequent transformation model may apply a template to the filtered dataset data to format and shape the dataset as needed by the particular requesting client entity's software platform.

The pipeline's model or models selected for a given client is also generally based upon the data being requested. For example, different device hardware needs streamed video data processed into a shape and format that the hardware understands, and thus when the data to be transformed and returned is video data, the transformation model or models selected for video data pipeline are selected from those appropriate for video data transformation. For user interface data, such as nodes of a client user interface graph, a dataset (e.g., arranged as a node) representing a television series episode is typically transformed differently to some extent relative to a dataset (e.g., arranged as a node) that represents a navigation menu.

In general, the client-specific information supplied with each request, along with the requested identifier (ID) of the requested piece of data (e.g., a Uniform Resource Name, or URN), are used to select the appropriate transformation models for that client entity's transformation pipeline. In one or more implementations, a regular expression corresponding to a requested URN is used to determine the type of data being requested, e.g., as represented by a filename/file extension. The client-specific information (e.g., client platform software version, device type and/or class, and sometimes state data) is used to select the transformation models for that type of data, e.g., by searching a subset of folder paths corresponding to the client-specific information for a matching filename. When more than one transformation model is needed, the models are arranged in a transformation pipeline configuration, in an appropriate order.

It should be understood that any of the examples herein are non-limiting. For instance, some of the examples refer to a data service associated with video streaming that returns video data, and also returns catalog items, such as built from various data sources to represent video content such as movies or shows via nodes that form a client graph. However, the technology described herein is independent of any particular type of data being returned, and/or may come from more than one data service. Further, the technology described herein is exemplified with respect to a data service having a front-end/client facing portion in which the transformation pipeline instances are implemented, and a back-end service portion that obtains and returns generalized/standardized data to the front-end as needed; however, this is only one implementation, and a single data service that operates to respond to client requests without separate front end and back end portions may benefit from the technology described herein. As another example, a file system is used as a hierarchical transformation model library in one or more implementations, but any mechanism that can relate client request information into resource references (e.g., any hierarchy of data structures, a database, etc.) may be used in alternative implementations.

Still further, as used herein, a "client" may be any requesting entity, not necessarily a remote client device/software platform that makes request to a data service. Indeed, as one example of another type of client, the data service front-end may be a client of the data service back end. As a result, some data transformation as described herein may be implemented at this lower data service level, e.g., one front-end server may be a version 2.0 client of the back-end data service, while another front-end server may be a version 3.0 client of the back-end data service, with different data transformation needs.

As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data retrieval/processing in general.

FIG. 1 is a block diagram representing example components that may be used to provide and work in conjunction with data requests as described herein. In FIG. 1, client requests 102 are received at a (e.g., front-end) data service 104. One such data service 104 comprises a cluster of generally load-balanced request handling server machines 106(1)-106(*m*), where m represents any practical number of server (virtual and/or physical) machines.

In one or more implementations, for handling client requests, the load-balanced server machines 106(1)-106(*m*) each have a client interface 108(1)-108(*m*), respectively. Some client data requests may be satisfied by data from a front-end in-memory cache, 110(1)-110(*m*), respectively. Also shown in FIG. 1 is a distributed cache 112, e.g., a REDIS cache shared among the request handling servers 106(1)-106(*m*) that also maintains data for responding to client requests. In a typical implementation, the distributed cache 112 is larger than the individual in-memory caches 110(1)-110(*m*), and has a higher hit rate; however the distributed cache 112 takes longer to access, e.g., needing a network request and response. Those client data requests that cannot be satisfied by front-end cached data are sent by a front-end request manager 114 to a back-end data service 116 over a suitable network connection or the like.

In one or more example implementations, the data item requests may correspond to nodes of a client user interface graph; (data item requests also may be for video data). The client user interface graph thus has nodes representing user interface objects such as menus, tiles, buttons, icons and so forth, with relationships between the nodes based upon references (edges) to other graph nodes. In general, visible representations of at least some of the nodes are rendered on the client device's display, whereby the client user interacts with those visible representations to perform some actions, such as to select a submenu of a menu, select an item (e.g., a movie icon) from that submenu, play the movie once the icon is selected, and so on. Once the play option is chosen, the client gets streamed video data, transformed as described herein for each client as needed.

Further shown in FIG. 1 is a back-end data service 116 that is coupled to one or more backing data sources 118. In one or more implementations, the back-end data service 116 comprises a cluster of generally load-balanced server machines 120(1)-120(*n*), where n represents any practical number of such server (virtual and/or physical) machines. In FIG. 1, the exemplified load-balanced data server machines 120(1)-120(*m*) each have a data retrieval component 122(1)-122(*n*), and an in-memory cache 124(1)-124(*n*). A back-end distributed cache 126 likewise is typically provided.

For requests that reach the back-end data service 116 but cannot be satisfied from any back-end cache, the back-end data service 116 is further coupled (e.g., via an intranet and/or the internet 120) to send requests for data to the one or more various backing data sources 118. Non-limiting examples of such data sources 118 may include key-value stores, relational databases, file servers, and so on that may maintain the data in virtually any suitable format. A client request for data (e.g., a graph node) may correspond to multiple sub-requests (for different parts of the graph node), and these may be to one or more of the backing data sources 118. Moreover, one data store's data may override another data store's data; e.g., the data for a television show may include a generic image URL obtained from one data store, however an "editorial"-like data store may override the generic image with a different image, such as for some uncharacteristic episode.

Whether via cached data or via the backing data sources, the back-end data service 116 ordinarily returns generalized (standardized for the front-end) data to the front-end data service 104. As described herein, via transformation of that data at the front-end data service 104, client-specific responses 130 to the client requests 102 are returned to each requesting client entity. Described herein is transforming the generalized data into client-specific (customized) data so that each requesting client entity receives the data in a way that each requesting client entity expects and/or is suitable for the client software, hardware, display characteristics, and so on.

Figure 2:
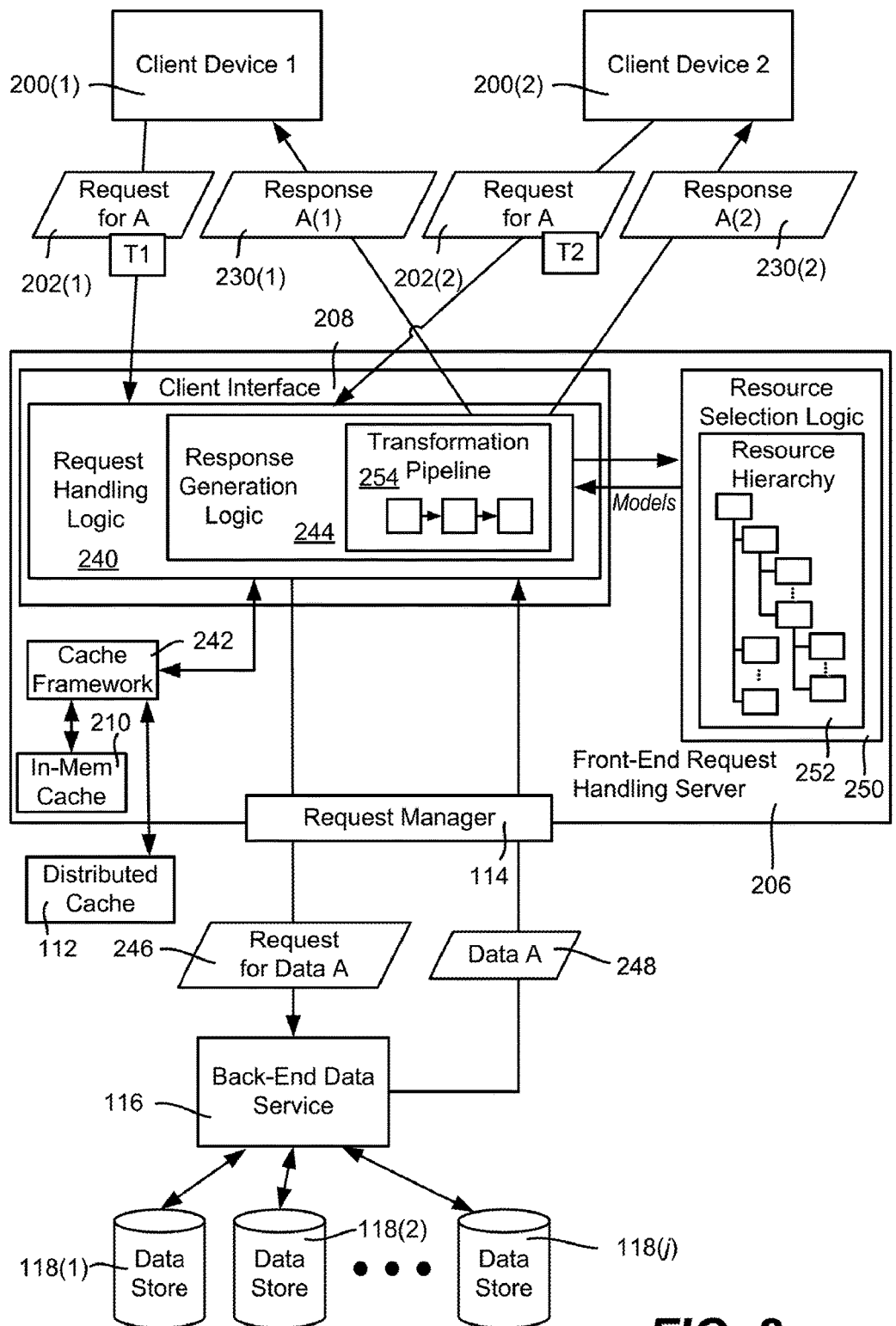
FIG. 2 is an example block diagram representation of components that use different transformation model pipelines to return client-specific responses based upon different requesting client devices, according to one or more example implementations.

FIG. 2 shows additional details of a front-end request handling server 206 in one or more example implementations. A client device 1 labeled 200(1) and a client device 2 labeled 200(2) send data requests 202(1) and 202(2), respectively, for data corresponding to data item A, where "A" represents some data service-unique identifier as described herein, such as a URN. The requests 202(1) and 202(2) may be sent at the same time or at different times. Each request 202(1) and 202(2) is associated with an authorization/access token or the like, T1 and T2, respectively, that provides client-specific information regarding the requesting entity, such as the device type (e.g., tablet, smartphone, entertainment and gaming console, personal computer browser, internet television device and so on, which may include being identified by device model and vendor), as well as software version information regarding the client software platform that is making the request. The device class may be looked up from the device type, for example, as described herein.

Request handling logic 240 of the client interface 208 receives the requests 202(1) and 202(2). In one or more example implementations, to check for cached data that can satisfy the request, the request handling logic 240 communicates with a cache framework 242 (e.g., an instantiated library), which handles cache read-through and write-through operations, such as first via an in-memory cache 210 of the server, and then if still needed via the distributed cache 112 shared with other front-end data service servers. If the requested data item's data (e.g., for data item A) is cached and not expired, response generation logic 244 processes the data (if needed) for returning appropriate responses 230(1) and 230(2) to the requesting clients 202(1) and 202(2), respectively. Note that the requested data already may be cached in the appropriate transformed state (e.g., shape and format) that a requesting client needs, in which event the data may be returned as is in a suitable response data structure. The response generation logic 244 is coupled to the request handling logic 240/client interface 208, e.g., whether as a separate component or a component incorporated into the request hander logic 240.

For a data item request that does not have valid front-end cached data, the request manager 114 makes a request 246 for the data to the back end data service 116. The data may be cached at the back end data service 116, or if not, is obtained from one or more backing data stores 118(1)-118(*j*). Note that the data for a data item A, such as an object of type "feature" that represents a movie, may be composed from different parts, e.g., a movie title, a rating, a plot summary, a URL to a representative image and so on, (some of which may be overridden by an editorial data store or the like), and thus the back-end data service 116 may need to make separate requests to one or more of the backing data stores 118(1)-118(*j*), and assemble the data into a node form or other suitable data structure.

Thus, if not cached and valid at the front end, in a typical situation in which no errors occurred, whether obtained via a back-end cache or a backing data store or stores, the dataset for data item A 248 is returned from the back end data service 116. The dataset of the response 248 may be cached by the cache framework 242 (e.g., in both the in-memory cache 210 and the distributed cache 112), and is provided to the response generation logic 244. Note that FIG. 2 allows for caching before any transformation to the dataset is applied; this may be one type of caching. However it is an alternative to cache the dataset after transformation is applied, that is, cache the client-specific node or other data structure, or to both cache the data before transformation is applied and after transformation is applied. It is also feasible to cache data during any of various states of transformation, e.g., after at least one transformation model is applied but before transformation through the full pipeline.

As described herein, the response generation logic 244 is coupled to resource selection logic 250, which selects resources including transformation models from a resource hierarchy 252. Each resource may comprise a file of a file hierarchy that is selected based upon the identified data item request and the client-specific information in each client token T1 or T2 or otherwise associated with the request.

The resource selection provides the transformation model or models that are appropriate for the client-specific request and data type, with the models applied in order in the transformation pipeline 254 to return a response 230(1) or 230(2) that is customized as needed for that client entity. Thus, for example, if client device 200(1) and 200(2) differ with respect to the data format/shape they are each expecting, the response 230(1) that contains data item A's dataset is transformed by one set of model(s) in one transformation pipeline instance in a way that differs in format and/or shape from the response 230(2) that also contains data item A's dataset but has been transformed by another set of model(s) in a different transformation pipeline instance.

Note that there may be many transformation pipeline instances running in parallel or substantially parallel, such as one transformation pipeline instance for each data type per each distinct client entity (device type/device class/version/state). Note that "distinct" with respect to clients may depend on the data type and model(s) in the transformation pipelines; e.g., for data type X, any client of device class Z gets the same pipeline regardless of version or device type differences, because at present there is only one version, and also there are no device type differences that matter in this particular transformation pipeline. The client-specific information along with the data type may be used to compute a key to map a request to a pipeline instance.

More particularly, transformation pipeline instances may be maintained in fast memory, including retaining them for some time after they are no longer needed (e.g., cached in RAM), such that requests for a same data type transformation from later requests of the same client device type/device class/version can use an previous transformation pipeline instance without having to again locate the files and arrange a new instance of a transformation pipeline for each new request. For example, the client-specific information that is provided along with the data type may be computed as a key to a key-value store, which may be implemented as a key to a pipeline instance in working memory, in the in-memory cache 210, in the distributed cache 112, and/or in one or more separate caches.

Still further, in one implementation, transformation pipeline instances are in the front-end servers, because the data service front-end servers deal with client specifics. Where appropriate, some load balancing operations may be used to direct like clients to the same front-end server or subset of front-end servers that are more likely to have existing transformation pipelines for such clients, rather than otherwise distribute the client requests; (as with the cached transformation pipeline hit rate, this similarly may improve the cache hit rate on requested data items). It is also feasible in alternate implementations to have the transformation pipelines operate below the front-end servers, e.g., as a transformation pipeline service with its own pipelines/caching between the data service back-end and front-end, or possibly in the data service back-end; (although in one or more implementations the data service back-end is generally not designed to deal with client-specific data).

Figure 3A:
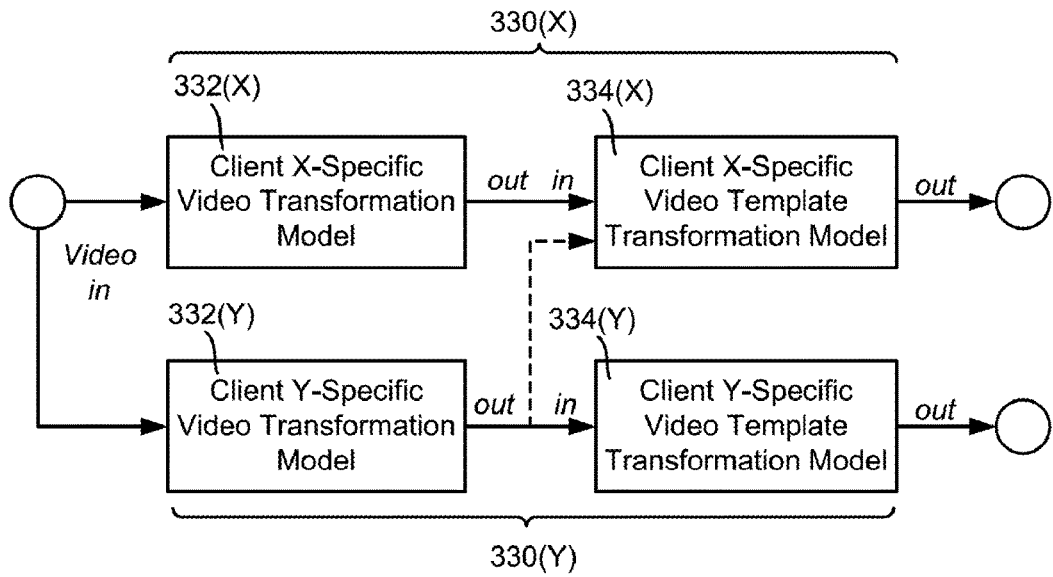
FIGS. 3A and 3B are example block diagrams representing transformation pipeline instances comprising different transformation models pipelines based upon client-specific information and data type information, according to one or more example implementations.

FIG. 3A shows example transformation pipeline instances 330(X) and 330(Y) for video data. For example, consider that a client device X is requesting streamed video, and is a smartphone from vendor A, model type 4, running client software version 2.0. As described herein, the hierarchy is arranged such that when the models (resources) for such a device are located, for the pipeline instance 330(X) the video transformation model 332(X) is selected to encode the video with the H.263 standard (known from the capabilities of the requesting device). The client-specific template transformation model 334(X) is also selected in this example, to put the encoded data into a suitable container format for streaming to that particular smartphone. A different device corresponding to a client device Y, (whether a different vendor, model type, class and/or software version), via the different transformation pipeline instance 330(Y), instead may have the same original video data encoded with another standard (e.g., the H.264 standard) via a different encoder model 332(Y). Thereafter, the transformation model 334(Y) puts the encoded payload in the appropriate container (or containers) via the client-specific template transformation model 334(Y).

Figure 3B:
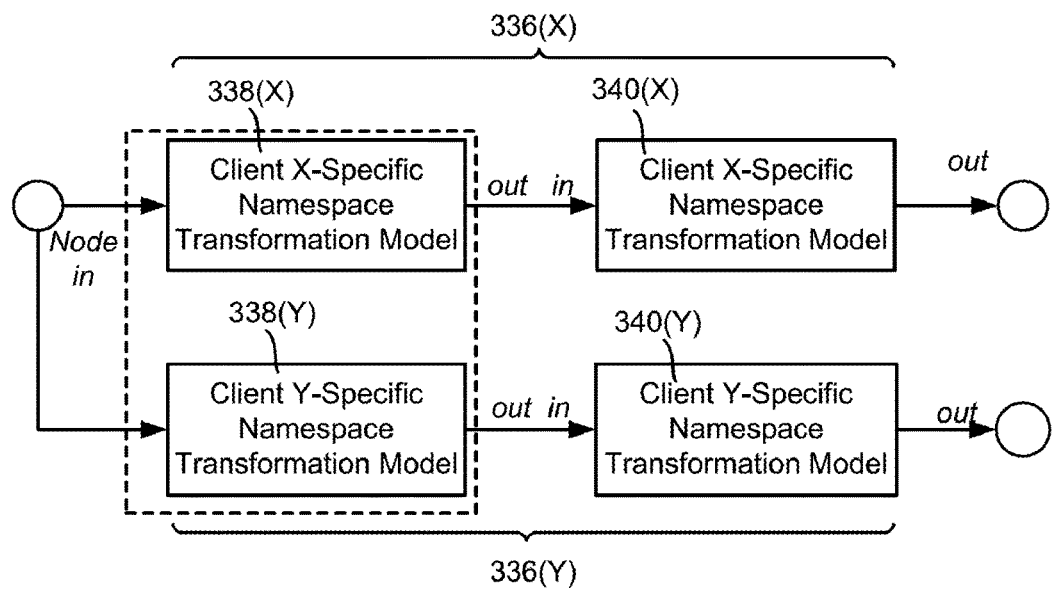

FIG. 3B shows example transformation pipeline instances 336(X) and 336(Y) in which data transformation models are selected for some data type, such as a navigation menu that is associated with a node identifier (ID) that is unique (at least within the data service). In this example, a namespace transformation model 338(X) for client X transforms the ID of that node such as used by the backend data service to a node in the client namespace, e.g., as clients expect each requested node data structure to be identified by a URN. For this data type and client, a client-specific template transformation model 340(X) is also used to process the dataset in the node into a format and shape that the requesting client expects, given the requesting client's device type, device class and/or the version of the client platform software that requested the node (and possibly state data associated with the request). If the requested data type was something else, such as a "feature" node representing a movie or television show, a different transformation pipeline instance may be used for the same client X.

The data transformation models 338(Y) and 340(Y) in the pipeline instance 336(Y) are used by the client Y, based upon some different client-specific information. Note that the same pipeline instance may be used for different clients and client requests that share the same client specific-information with respect to a pipeline for a data type.

Note that it is feasible to couple the output of one transformation model to the input of another transformation model, even when the other transformation model is part of another pipeline. For example, in FIG. 3A, the dashed line from the output of the model 332(Y) to the input of the model 334(X) may represent a valid path if both client X and client Y use the same video template transformation model, e.g., use the same container even though the video data for each is encoded differently. This inter-pipeline coupling is more complex, and also may slow the pipeline throughput in some scenarios; however in other scenarios it may be beneficial, e.g., if a transformation model processes input fast enough relative to the models that input data to it, that transformation model may be shared to save resources. Similarly, the same transformation model may output data to the inputs two or more different transformation models. For example, in FIG. 3B, there may be only one namespace transformation model (as represented by the dashed box), with different client-specific transformation models receiving output therefrom. Indeed, multiple pipelines may be interconnected in any way, including ones that form a lattice structure of transformation models, for example, as long as for any dataset the client-specific information (e.g., computed as a key) accompanies the transformed dataset so that the correct path through the lattice structure is taken whenever client-specific data transformation is relevant.

It is also feasible to have a single pipeline instance with multiple (e.g., slower) instances of the same models operating in parallel. For example, one (fast transformation) model may alternate its transformed output between the inputs of two (or more) parallel (slow transformation) models, which in turn may couple their outputs to any number of the next model's or models' input(s); three models may couple their outputs to two model's input, and so on. As long as the data input into the transformation pipeline is appropriately transformed at the pipeline output for a requesting client entity, any configuration of models within the pipeline is acceptable including configurations designed to maximize throughput, re-route upon failures, and so on.

Figure 4:
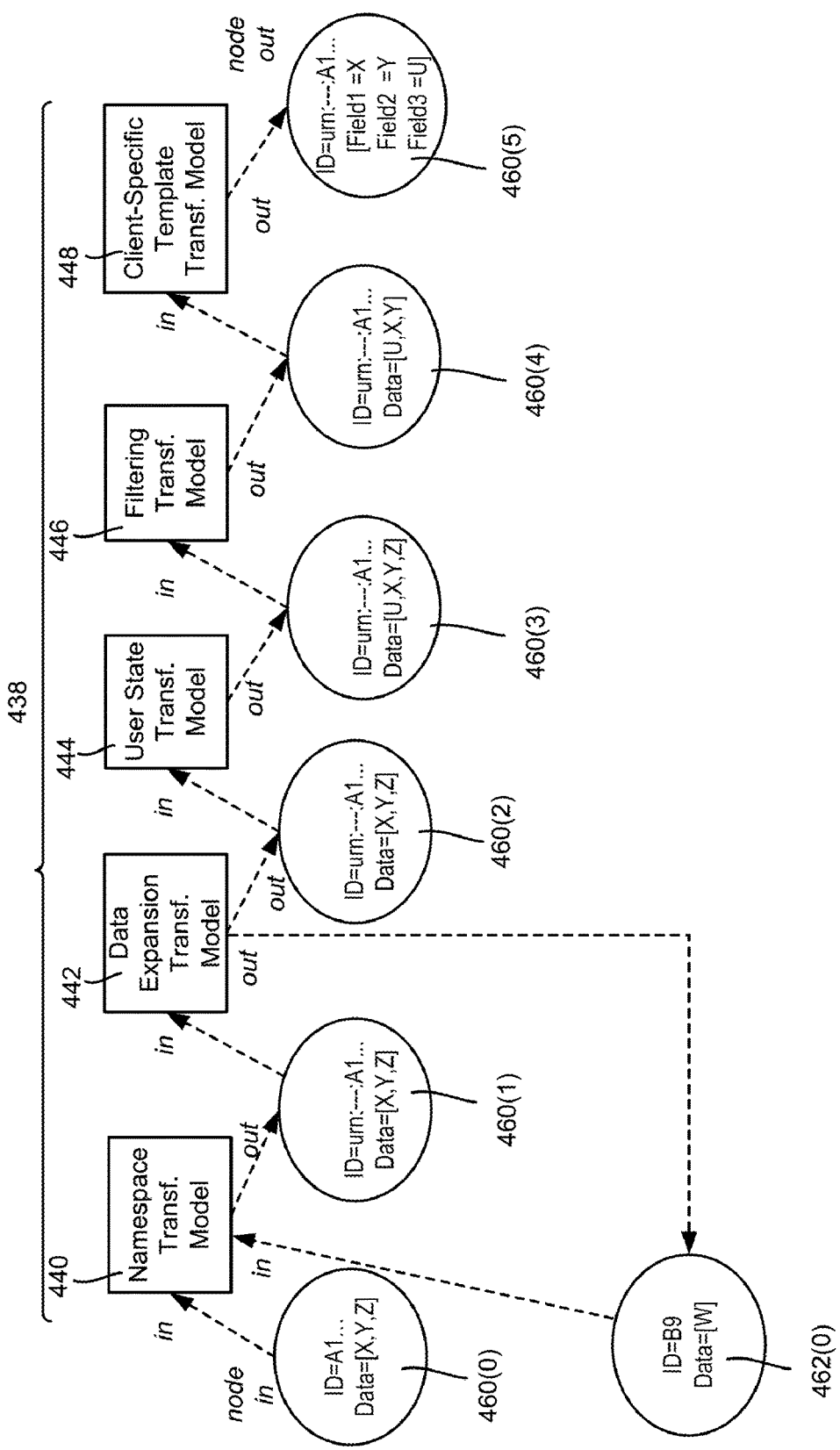
FIG. 4 is a representation of example transformation models arranged in a transformation pipeline instance, with each model transforming example data in a node data structure, according to one or more example implementations.

FIG. 4 shows a transformation pipeline 438 for a simplified, hypothetical data item comprising a node data structure 460(0) that is returned from a data location with an identifier of "A1 . . . "; note that if not already in a desired node format, a transformation model (not shown) may convert data of any data structure understood by that model into a desired node format. In this example, the node data structure 460(0) is fed into the transformation pipeline 438, which has as its first transformation model a namespace transformation model 440, which in this simplified example processes the ID (and any other appropriate data such as edge node identifiers) from the naming convention used in the input data structure into a URN.

Another possible transformation model resource is one that expands a response into an expanded response. For example, a device may request data item "urn: - - - : A1 . . . ", and get back in response(s) the requested data item "urn: - - - :A1 . . . " and also data item "urn: - - - :B: . . . ", e.g., in anticipation of a likely need for data item "urn: - - - :B: . . . ". After (untransformed) data item "A1 . . . " enters the pipeline, the untransformed data item "B9 . . . " represented in FIG. 4 by the data structure 462(0) can enter the pipeline for like transformation; (transformation models may have queued inputs, for example; also, there may be multiple instances of the same pipeline if needed). A data type, device type/class version specific resource file, represented in FIG. 4 by the transformation model 442, may specify such expansion rules that represent a requested data item, what expanded data item(s) to return with a response; (different client-specific/data type expansion rule files may be needed, such as return more expanded items to a device with more memory than to one with less memory, for example). Note that such data expansion is shown in the pipeline as one feasible expansion mechanism; it can be appreciated that alternatively or in addition to requesting expanded data items via a transformation pipeline, a single data item request may be expanded into multiple data item requests before any data is even returned for pipeline processing. Transformation of the data item "B9 . . . "/data structure 462(0) is not described further herein for purposes of brevity, although it is noted that there may be a limit on expansion levels, e.g., the expanded data structure 462(0) may not be further expanded, or may be expanded only one more time, and so on.

Continuing with the example of FIG. 4, a next transformation model in the transformation pipeline 438 for this client and data type is a user state transformation model 444. For example, consider that a user starts with a root navigation menu, which for example, allows navigation to sub-menus, a search page, and so on. If the user state is logged in, the user expects a root navigation menu that includes an interactive link to a user's saved favorites or the like (e.g., via a User node). If the user state is not logged in, there is no such link/node. Any other state-based transformations may be used, e.g., a holiday theme flag may be turned on in the node's data (such a theme may be applied elsewhere, such as via a template file).

In FIG. 4, the user state transformation is exemplified by some piece of data "U" being added to the original data "X,Y,Z", shown as Data=[U,X,Y,Z] in the node data structure 460(3). Note that instead of adding "U", an alternative is to start with "U" in the dataset and remove it when the associated state is "not logged in," as long as the value of "U" at this time is the same for all users, such as an interactive link with its destination data to be determined later, (because such user-specific information ordinarily is not known until the user logs in).

Yet another transformation model exemplified in the transformation pipeline 438 for this particular client and data type is a filtering transformation model 446. Consider, for example, that version 3.0 of a client software platform expects Data=[U,X,Y,Z] (or Data=[X,Y,Z]), but version 2.0 is unable to handle the piece of data identified as "Z" and breaks (e.g., crashes or becomes unstable) if [U,X,Y,Z] or [X,Y,Z] is improperly returned for this data item. The particular filtering transformation model 446 is included in the transformation pipeline for version 2.0 clients, and contains information (e.g., a declarative statement) that deletes "Z" from the input data structure 460(3), resulting in the output data structure 460(4) that has "Z" removed from its data, Data=[U,X,Y].

In the example of FIG. 4, a final transformation model 448 in the transformation pipeline 438 is a template resource, which formats and shapes the data to meet the specific client's need for the node of the requested data type. Consider, for example, that (for whatever reason) a certain client software platform expects the data to be reordered so that any User node "U" is last, and the data placed into certain fields named Field1-Field3. Thus, the node data structure 460(4) is input and processed into the node data structure 460(5), which now contains Field1=X, Field2=Y, and Field 3=U.

Note that other types of transformation models are feasible, including some that are not declarative transformation models (e.g., based on declarative statements). For example, some transformations cannot be done declaratively using templates, and are done by custom transformation code instead, and are referred to herein as custom transformation models.

As can be readily appreciated, one transformation model may expect the data in one transformed state when input thereto. For example, the expansion transformation model 442 may expect its input data to be in a node with its identifier in the form of a URN. When this is the situation, the ordering of models in the transformation pipeline instance needs to be arranged such that each upstream transformation model's output is something that is expected or otherwise able to be handled by a downstream transformation model.

As can be seen, virtually any model may transform the data as needed for a requesting entity based upon the requested data type and the device type/class/software version and/or associated state data. Because of the data transformation pipeline, the data sources (and the employees or the like that maintain them) need not be concerned with maintaining different data to support backward compatibility and/or customizations for versions, device types, device classes, state and the like. Instead, (at least in most cases), only one generalized instance of a data item need be maintained and returned.

Figure 5:
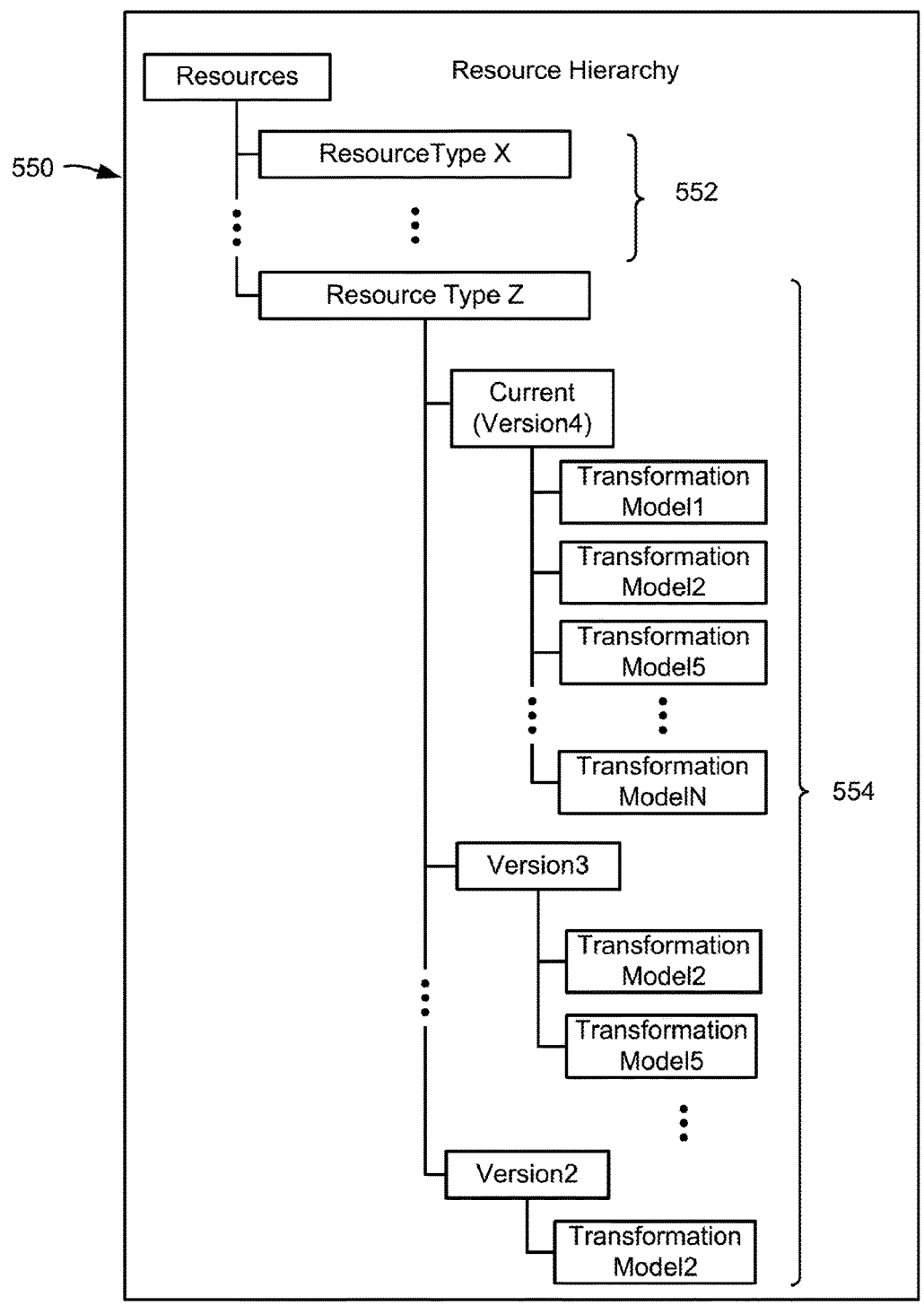
FIG. 5 is an example representation of a hierarchy of data files for transformation models, according to one or more example implementations.

Turning to another aspect, one or more implementations maintain resources including transformation models in a hierarchy, which for example may be files in a file system hierarchy. FIG. 5 shows an example of a version hierarchy 550 for resource types divided into sub-hierarchies 552 and 554, (where, for example, one resource type's sub-hierarchy may contain templates, another resource type's sub-hierarchy may contain expansion rules, with another resource type's sub-hierarchy for storing navigation menus, and so on). Thus, in the example hierarchy 550 for FIG. 5 for a resource type of Z (e.g., a "template" transformation model), a path may exist for template/version2/*.*, another path for template/current/*.* and another for template/version5/*.*. There also may be an even less-specific, default folder for resources.

As can be seen, by arranging the hierarchy 550 with the resources (e.g., files of a file system hierarchy of folders and files) and then following folder paths such as from any more-specific override file towards a least-specific file, the most-specific file that is available for the requesting client is matched to the client's specific information that is received with the client request. This allows the straightforward addition of new files to the hierarchy as new versions are released, while allowing older existing files to override the new files if there are differences between the versions. The pipeline is extensible by replacing transformation models with updated models as versions change over time. Further, the response generation logic may include new transformation models as desired, e.g., to transform a new data type that the data service supports.

By way of example, consider that different version clients make requests that correspond to the files for resource type Z. Version 4.0 clients, which in this example is the current version, may have selected for them a set or subset of the resource files [Resource1, Resource2, Resource3 . . . ResourceN], which in this example are transformation models; none of these files are overridden. In contrast, version 3.0 clients get the same file set or subset but in this example with some files overridden, namely the files Resource2 and Resource3 (Transformation Model2 and Transformation Model3) from the version 3 subfolder will override (be used instead of) those that are in the version 4 subfolder. Note that different ways to override are feasible, including to search for the file first in the more specific subfolder (e.g., version 3.0) and select that file if it exists, and if it does not exist, continue to the next less specific subfolder, and so on (as exemplified in FIG. 8). An alternative way is to initially select the full set or subset of least specific files, and then replace each one with any more specific file that exists.

It should be noted that version-based sub-hierarchies as in FIG. 5 may be combined with device types and/or device classes and state differences by having further having sub-hierarchy arrangements. For example, using a file system hierarchy of files and folders, a device class A folder may be a parent folder to version subfolders 1.0, 1.1, 2.0, 3.0 and so on, (e.g.: DevClassA/V1.0/filename1.ext, DevClassA/V1.0/filename2.ext, DevClassA/V1.1/filename1.ext, DevClassA/V1.1/filename2.ext, and so on). Alternatively, each version folder may be a parent folder to device class and/or device type subfolders, (e.g.: V1.0/DevClassA/filename1.ext, V1.0/Device120/filename1.ext, V1.1/DevClassA/filename1.ext, V1.1/Device120/filename1.ext, and so on). Note that other differentiation mechanisms corresponding to further sub-hierarchies are feasible, e.g., low bandwidth connection versus high bandwidth connection subfolders, low latency versus high latency subfolders and so on, such as to select different resource files including transformation models based upon variable network conditions, other state data, and the like.

Figure 6:
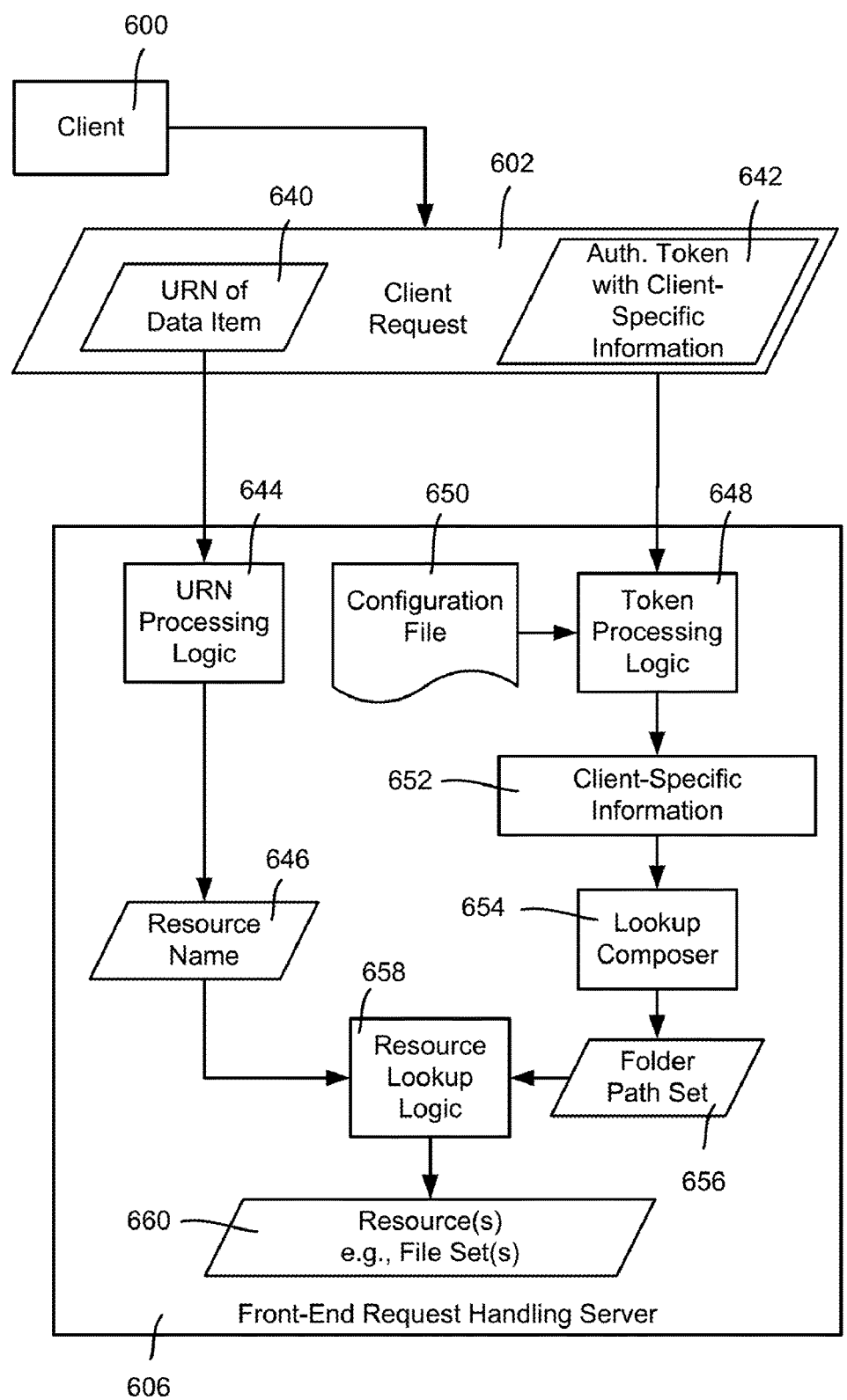
FIG. 6 is an example block and representation of how information associated with a client request may be used to select client-specific transformation models, according to one or more example implementations.
Figure 7:
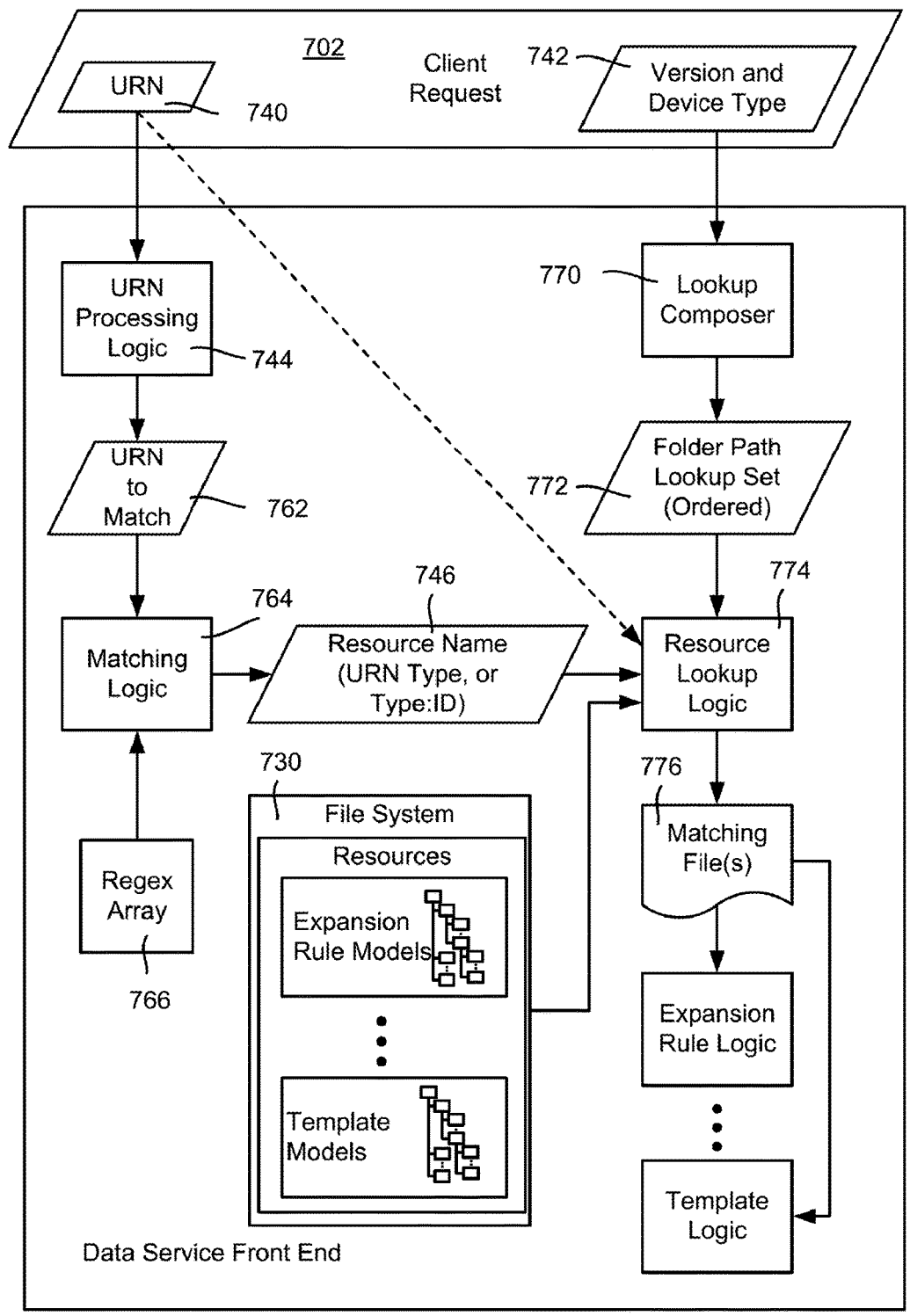
FIG. 7 is an example block diagram and representation of how information associated with a client request may be used to select one or more client-specific transformation models for a file set comprising transformation model files maintained in a file system hierarchy, according to one or more example implementations.

Turning to aspects related to resource (transformation model) selection, FIGS. 6 and 7 show one example implementation of how a request 602 from a client 600 is processed to determine which resource to select. As described herein, client requests include an identifier of the desired data such as an object identifier (object ID), which may be in the form of a URN 640 (multiple URNs may be identified in batch requests). A client request also includes a token 642, which among other purposes (e.g., authentication) may include client-specific information such as version information and a device code that indicates the type (e.g., the vendor and model as needed to differentiate from others) of the requesting client device. The software version information may include the device code, or vice-versa, or may be in another code (e.g., appended to a device-only code); for purposes of explanation, consider that as used herein, "client-specific information" identifies the software version and/or any device type/device class information. Client-specific state information may be similarly included as a code or the like, although for logged in (or not) state, the "Auth. Token" data may be used to determine whether or not a user is logged in.

In general, URN processing logic 644 determines a resource name 646 from the URN, which may be a type:ID combination. For example, certain types of requests may be grouped together as a type of resource; e.g., for requests for a television "Series" type, a subset of the resource hierarchy may have resources named "series.ext", requests for a "Season" type may have resource resources named "season.ext", and so on (where ".ext" represents a file extension that is appropriate for a resource, e.g., "/folder path/*.template" for a template transformation model. A more specific example of URN processing logic is described herein with reference to FIG. 7.

Along with processing the URN, token processing logic 648 uses information in a configuration file 650 to obtain any needed client device-specific information 652 based upon the device code, e.g., device class, device type, (and if in the code, software version information and state). For example, each client's client specific information, via the configuration file 650 or the like on the front-end data service server 606, may be mapped to a device "class" comprising a category of devices that generally share the same design and thus tend to have the same data requirements, possibly with some device-specific exceptions. For example, a particular smartphone from the same vendor may have at least some of its models configured to run the same client platform software and thus expect the same form of each data item's data, as also matched to the client's software version.

Using this client device-specific information 652, a lookup composer 654 builds a set of paths to the resources in the hierarchy. If, for example, the resource hierarchy corresponds to a file system hierarchy, then the paths to the resources are in a set of folder paths 656. A more specific example of token processing logic 648 and corresponding resource selection is described herein with reference to FIG. 7.

In one or more example implementations, the set of folder paths are ordered so that more specific files override least specific, as described below with reference to FIG. 8. Resource lookup logic 658 uses the resource name 646 and the folder path set 656 to find the most specific resource 658 that applies to the request.

FIG. 7 shows an example of finding applicable resources for a client device and software version via a hierarchical file system 730, in which data items are identified and requested via a URN that is unique (at least within the data service). When a client request 702 is received, along with the provider URN ID(s) 740 requested, the client-specific information (e.g., version and device type 742) is also known to the data service front end server as described herein.

In one or more example implementations, URN processing logic 744 provides each client identified provider URN into each URN to be matched 762, and matching logic 764 accesses a set of regular expressions (e.g., arranged in a Regex array 766) to determine a resource name 746 (e.g., a string) corresponding to the type or type:ID that matches the regular expression derived from that URN 762. The resource 746, e.g., represented by the text of the string, is thus determined based upon the provider type or the provider type:ID.

In one or more implementations, the regular expressions are part of a configuration file comprising an array whose elements are a regular expression/rule (e.g., resource) name pair. For example:

```
// rules.json
{
  rules: [
    {
      name: "series",
      regex: "^urn:hbo:series:([a-zA-Z0-9_\-])+$"
    },
    {
      name: "navigation",
      regex: "^urn:hbo:navigation-menu:([a-zA-Z0-9_\-])+$"
    },
    // and so on ....
  ]
}
```

A configuration file is read in on service startup, and the regular expressions (with their rule name pairs) are compiled from the configuration file into the Regex array 766. In one or more implementations, this array 766 of regular expressions is then applied, in order, one-by-one via the matching logic 764, to the URN to match 762, and the first regular expression that matches is considered the matching resource; (note that because more than one can match, order matters and thus the array is ordered more specific to less specific, in general). The name of this resource is returned from the matching engine and is used in resource lookup.

For example, for a series type URN, (e.g., "urn:hbo:series:gameofthrones") the selected resource filename may be based only on the type, such as "series.template" or the like corresponding to the resource name string "series" matched by the matched by the matching logic 764. Overrides/more particular files relative to the type may be made by having the regular expression array have a matching type and ID. For example, a URN such as "urn:hbo:navigation:FAQ" may have an entry in the regular expression array 766 such that the matching logic 764 matches the type (navigation) and ID (FAQ), with a string such as "navigation.FAQ" such that the resource lookup logic 774 looks for an resource file named "navigation.FAQ" or the like.

It should be noted that in a more simplified system, e.g., in which there only relatively a few data items rather than thousands of nodes of different types, the data item IDs may be more directly used, (e.g., as represented in FIG. 7 by the dashed arrow). For example, if only dozens of data items had to be dealt with for resource selection, then each data item ID (or unique portion thereof) may be used as is the "resource name" for resource lookup, e.g., without regular expression matching and so on, as described herein.

For matching the resource name 746 (e.g., derived from the URN) to the client-specific information (e.g., block 742, including client device data, any state data, and/or software version), which in this example implementation has one or more associated resource files, the file system hierarchy is leveraged. More particularly, based upon the client-specific information, a lookup composer 770 builds (or retrieves from a cache if previously built) a set of file system folder paths 772 for this request, in which the paths are ordered so that more specific overrides less specific resource files.

For example, a folder path lookup path may include something such as [" . . . \resources\v3\deviceA\series.template" and " . . . \resource\resources\v3\default\series.template"]. Note that the file system folders and files may be maintained in relatively fast memory, e.g., RAM, whereby retrieval of the file is extremely rapid.

In this example, within the file system, a resource file may exist that corresponds to the type or type:ID for the data item's URN as exemplified above. If a specific resource file exists, that resource file is used, otherwise a less specific (e.g., a default) resource file is used. For example, for version v3 of a device A, a specific device A series resource file may be found and used, whereas for version v3 of a device B, no specific resource file is found, and thus the default resource file is used for device B. In one or more implementations, such a default resource file always is present in the hierarchy (or this situation is an error). For software version differentiations, the current version folder may be the default folder. As a more particular example of the inheritance nature of the models a "threefoot" model will override the default model, whereas "iphone" will override the threefoot model, and so on.

To summarize the concept of resources and resource loading, including customizing output for specific devices, in one or more implementations, when a client makes an authorized request to a client-specific service, the client provides an authorization token that contains client-specific information, such as a version and a device code. This client-specific information is used in part, along with the data item or data item type, to locate one or more resources that determine what the client receives in response to a request as described herein.

As can be readily appreciated, there are various ways in which to select one file over another based upon versioning information. If a single resource file (or other relatively small number of resource files) is being sought for a request, then it is efficient to look for that file or file set in folder paths arranged from most specific to least specific, and return the first file found.

Figure 8:
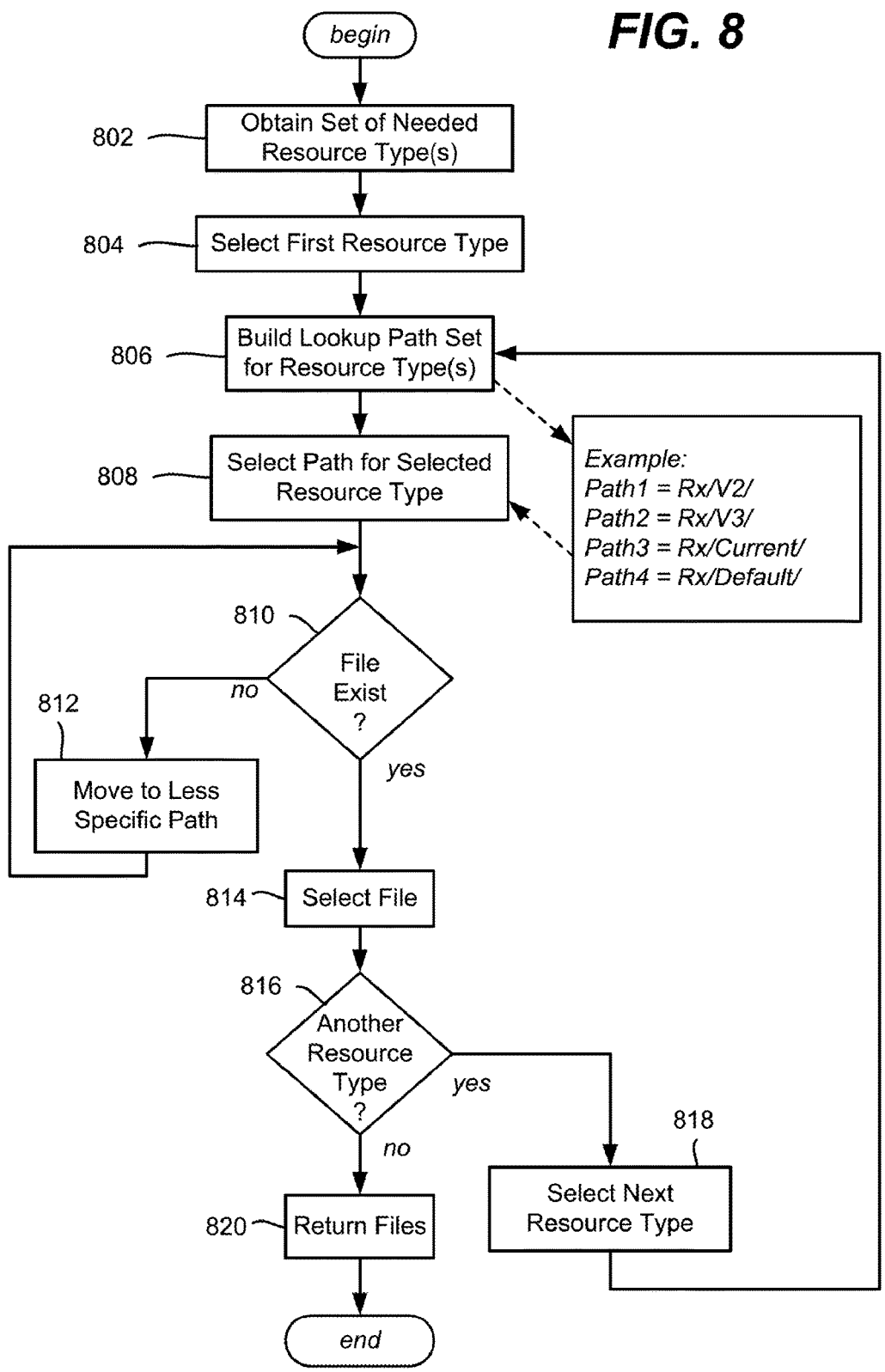
FIG. 8 is a flow diagram showing example logic/steps that may be taken to select transformation model files based upon a client's specific information (e.g., software version) by traversing a file system hierarchy as needed from a most specific folder path to a least specific folder path, according to one or more example implementations.

FIG. 8 shows an example of seeking a file for each resource type. For purposes of explanation, only a version differentiation is used in FIG. 8 as client specific information, although it is understood that device type or device class along with version information may be used to locate a file, by having device/device class subfolders and building such additional information into the pathnames.

Step 802 represents obtaining the set of resources for which a file is desired for each, e.g., a template file and an expansion file for a version 2 (V2) client. Step 804 represents selecting the first resource type, e.g., resource type template, with step 804 building the paths from most specific to least specific (Rx/V2/filename.ext, Rx/V3/filename.ext, Rx/Current/filename.ext, Rx/Default/filename.ext, where "Rx" represents the resource type's actual subfolder name, e.g., "/Templates" for now. Step 808 chooses the most specific folder path in the lookup set, e.g., Rx/V2.

Step 810 evaluates whether the file exists in the selected folder path; if so, that file is selected for use (step 814). Otherwise, step 812 changes to the next most specific folder path, e.g., Rx/V3, to again look for the filename for the file being sought.

In one implementation, a default subfolder contains some version of the requested file, whereby at least one file is found that satisfies the lookup. Note that the current folder may be the default folder, although in other implementations these may be different folders.

Steps 816 and 818 repeat the process for the next resource type, e.g., this time /Rx represents "/Expansion Rules" or some other appropriate subfolder name. As many resource types as needed for a request may be used in this manner. When the files have been located for each resource type, step 820 returns the file set to the appropriate entity, e.g., the response generation logic 244 of FIG. 2. These files are then arranged in the transformation pipeline instance for this request.

As set forth above, once a transformation pipeline is configured, it may remain in memory (e.g., in working memory and/or a pipeline cache; the working memory may be used as the cache) and be used for other data requests. To this end, the various selection criteria (data type, device type/class, state, version) may be used as a key to a key-value pair or the like, with the value, if present, being an existing pipeline (or a reference to an existing pipeline). Cached pipelines may expire like any other cached data.

Note that an alternative way to retrieve needed transformation model files for the pipeline may be more efficient if a relatively larger number of multiple files are to be returned for the same resource from the set of folders. In this alternative way, all files of the least specific folder(s) are initially selected as a complete file set; these files are replaced with any more-specific files that exist. In other words, the file location process starts with the least specific file set, and searches folders in a direction towards more specific/earlier versions of files, replacing those files as appropriate. Thus, using software versions for example, a version 2.0 client device type A gets a file set starting with the complete set of the most current version, e.g., version 4.0, then replaces each file in the file set with any version 3.0 file(s) that exist, and then replaces any file(s) in that (possibly modified) file set with any version 2.0 files that exist. The same mechanism may be used for device classes and types, that is, start with general device class default files, and replace with more specific device type files that exist, and so on. In any event, the final file set contains the most specific files for that client device.

Whether building the file set from most specific to least specific (as exemplified in FIG. 8), or replacing a file set of less specific files with more specific files, a significant advantage is that only the older version files that need to be maintained are actually maintained. For example (again using software versions, although applicable to device types and classes, and state differences), if some version 3.0 file X is unchanged in version 4.0, then the version 3.0 file is moved to the version 4.0 subfolder, as this file instance applies to both version 4.0 and version 3.0 clients (and possibly version 2.0 clients and version 1.0 clients). Only if there is a difference between files, e.g., the version 2.0 and version 4.0 for this file differ, does the earlier file need to be maintained in its specific subfolder.

Figure 9:
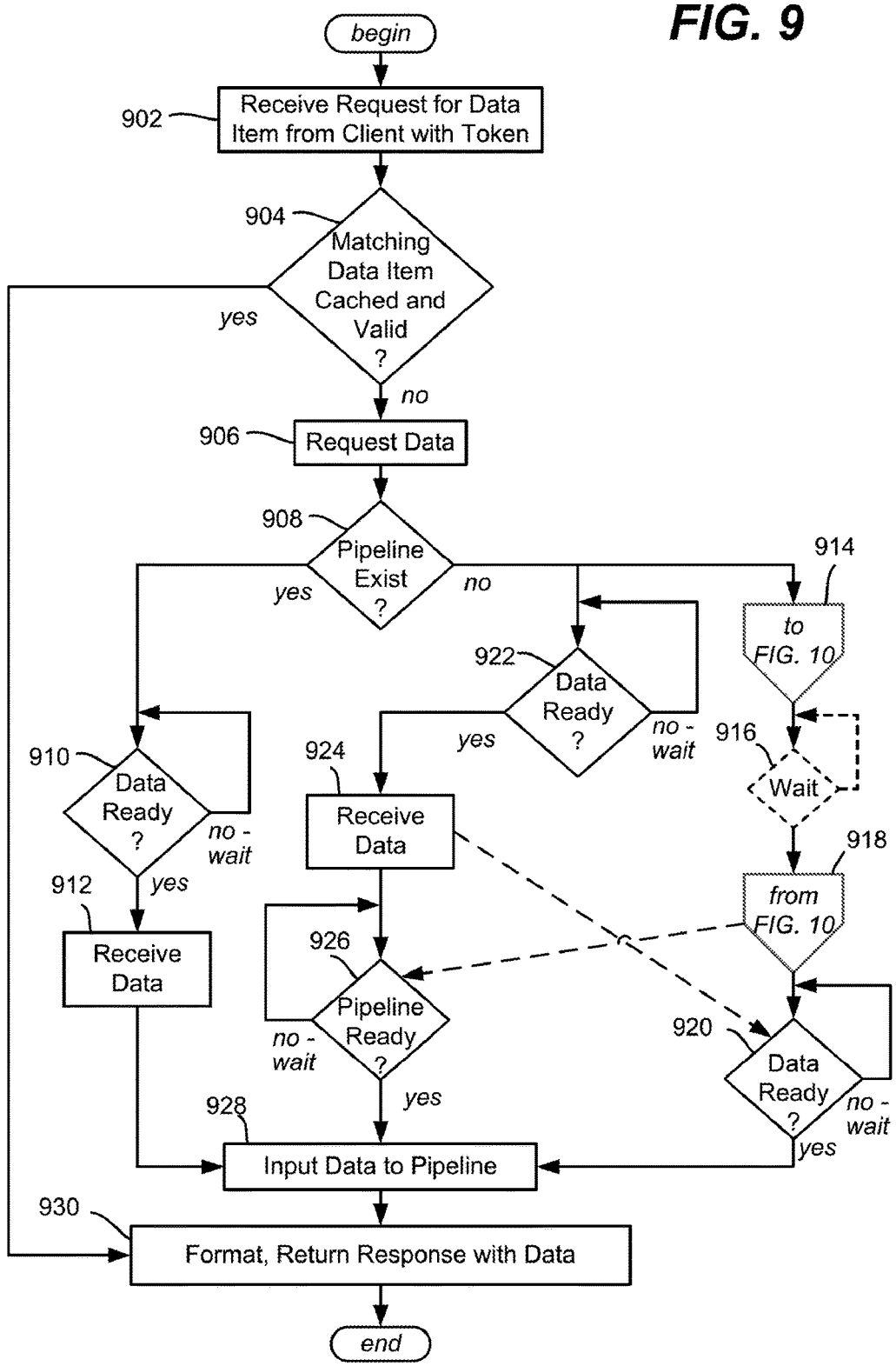
FIG. 9 is a flow diagram showing example logic/steps that may be taken to return a response to a client request, including processing generalized data through a client-specific pipeline instance to obtain customized data for the requesting client entity, according to one or more example implementations.
Figure 10:
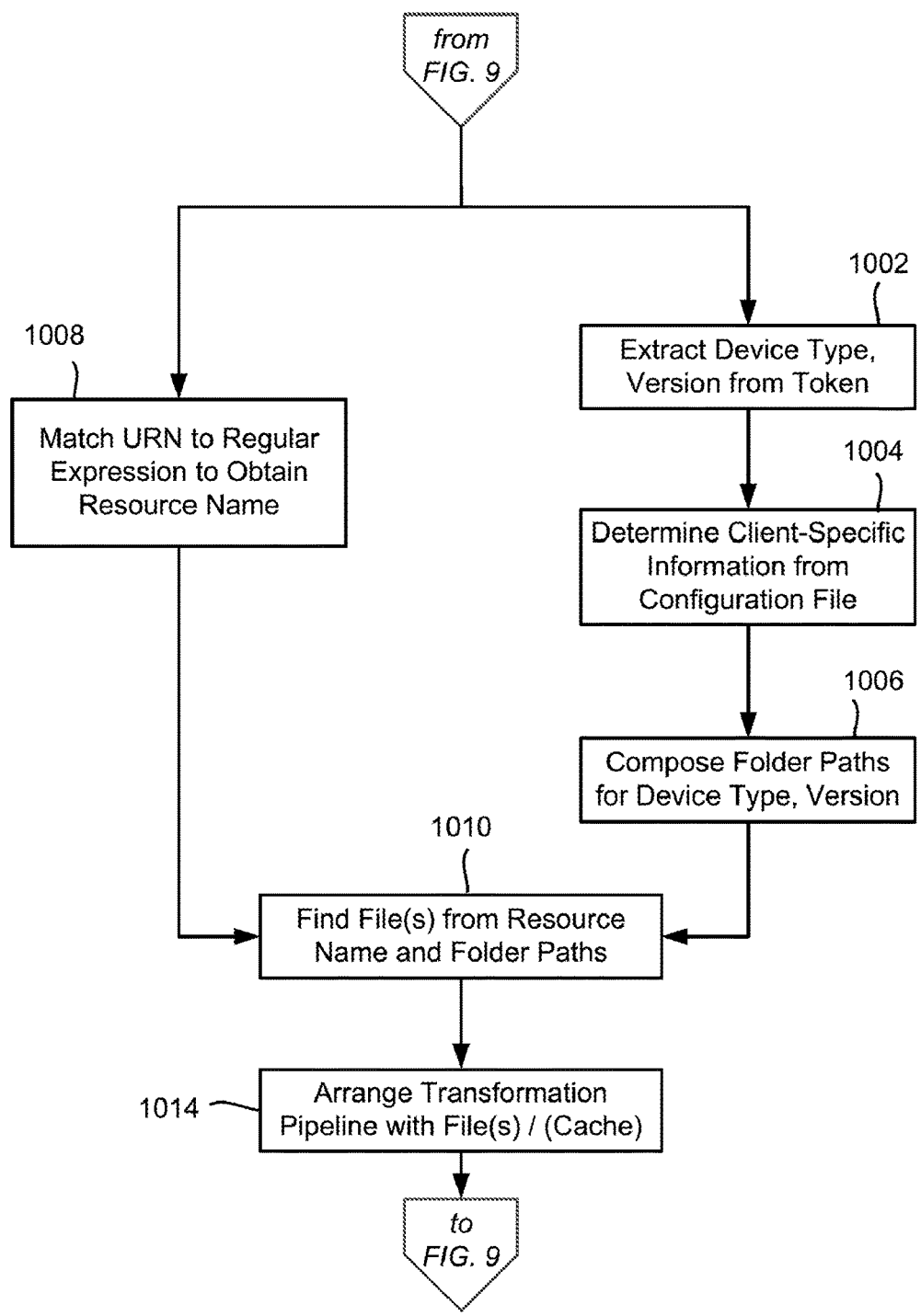
FIG. 10 is a flow diagram showing example logic/steps that may be taken to select transformation models to configure a pipeline instance based upon a request for one or more data items and client-specific information, according to one or more example implementations.

FIGS. 9 and 10 comprise a flow diagram showing example steps that may be taken in one or more implementations when a request for data is received, e.g., at a front-end data service, as represented by step 902. Step 904 represents determining whether the requested data (e.g., item or video) is cached and valid in the appropriate format/shape for the requesting client, and if so, branches to step 930 which formats the response to include the requested data item and returns the response to the client.

If not cached, step 906 requests the data, e.g., from the backend data service. The data item may be returned quickly, such as if cached at the backend data service, (although as set forth above, such a cached item has typically not been run through the appropriate pipeline, because the pipeline in this example architecture operates at the front end).

If an appropriate pipeline instance already exists, (e.g., the client or a client with matching client-specific information has recently requested similar data), then the existing pipeline may be used once the data is ready. Step 910 represents waiting for the data until received at step 912, after which the data is fed into the pipeline at step 928. Note that step 910, as well as any other steps in FIG. 9 that refer to waiting, represent waiting in general, and may not actually be a loop; such "waiting" steps do not block in one or more implementations, and instead can be event driven, for example.

If an appropriate pipeline does not exist, the request needs to have corresponding client-specific transformation models located and arranged into a pipeline instance. This is generally represented in FIG. 10, described herein, which in FIG. 9 correspond to the steps labeled in FIG. 9 as step 914, step 916 (the delay to locate the models and build the pipeline) and step 918.

In parallel or substantially in parallel with building the pipeline, the request for the data is taking place. Step 922 represents waiting for the data to be ready, with step 924 representing the receiving of the data, e.g., from the backend server.

Steps 920 and 926, in conjunction with (represented via the dashed arrows) the return from FIG. 10 at step 918 and the data being returned at step 924, represent waiting until both the pipeline is ready and the data is ready, regardless of which is ready first. When both are ready, the process advances to step 928 which inputs the data to the pipeline. (Note that it is feasible to begin transforming the data in a partial pipeline, as the downstream models of the pipeline are being added; this may be beneficial in some scenarios, such as if an upstream, relatively slow transformation model takes a long time, because the downstream model(s) of the pipeline instance can be located and built generally in parallel while the upstream (slow) transformation model's is processing the data.)

At the other end of the pipeline, the data is output, now in the appropriate format and shape corresponding to the requesting client. At step 930, the post-pipeline processed data is returned in a formatted response to the requesting client.

FIG. 10 is directed towards example steps for configuring the pipeline. Step 1002 represents extracting the device and software version information from the token, which step 1004 processes into the client-specific information. Step 1006 composes the ordered set of folder paths based upon the client-specific information, e.g., device class, device type and/or software version, possibly along with client state. With the resource name and folder paths, the desired file(s) are located at step 1012. Step 1014 adds the file or files to the transformation pipeline, which, as described above, may be cached.

Step 1008 represents matches the data item identifier URN against the regular expression array to find a resource (rule) name. As described above, the resource/rule name corresponds to the filename in one or more implementations; e.g., the resource name for an episode type URN may be the string "episode" with the appropriate extensions appended, such as an extension for episode template files, another for filtering files, and so on.

It should be noted that the two exemplified branches of FIG. 10 may have their steps performed at generally the same time. In a parallel system, these operations may occur at basically the same time, with step 1010 awaiting both results. Note however that steps 1002 and 1004 may be performed before any other example steps, along with performing some additional straightforward operations, such as to first verify that the client version is that of a supported, valid version and so on.

As can be seen, there is provided a processing pipeline architecture that allows the same general datasets to be maintained by a data service, with those general datasets processed into customized datasets for requesting clients. Each pipeline instance provides for returning a customized dataset to each client based upon client-specific information and the type of data being requested. The transformation models for a pipeline instance may be selected by searching hierarchically arranged data structures (e.g., declarative files of a file system) to find transformation models that match each client's client specific information for a requested data type. The pipeline instances may be cached.

One or more aspects are directed towards a request handling component that receives a request from a client device for data having associated data type information, and obtains generalized data corresponding to that request, in which the request has associated client-specific information. The request handling component is coupled to (e.g., incorporates) a data transformation pipeline comprising one or more transformation models, each transformation model in the data transformation pipeline corresponding to the client-specific information of the client device and the data type information. The request handling component provides the generalized data for input into the data transformation pipeline, and receives transformed output data from the data transformation pipeline, in which the transformed output data is transformed by the one or more transformation models of the data transformation pipeline into customized data for the client device according to the client-specific information. The request handling component returns the customized data in response to the client request.

The data transformation pipeline may include a template transformation model that formats data based upon the client-specific information and/or shapes data based upon the client-specific information. The transformation pipeline may comprise, but is not limited to, a video transformation model, a template transformation model, a filtering transformation model, a namespace transformation model, a user state-based transformation model, a custom transformation model and/or a data expansion transformation model. The transformation pipeline may be maintained as a transformation pipeline instance that is useable for a plurality of client requests.

The transformation models may be maintained in a hierarchy arranged according to a plurality of different client-specific information combinations. The transformation pipeline may be built for the client request by searching the hierarchy using the client-specific information associated with the request and the data type information associated with the request to select a subset of the transformation models in the hierarchy for the transformation pipeline. The transformation pipeline may be built with transformation models, in which based on the client-specific information and the data type information, a more-specific transformation model overrides a less-specific transformation model. The hierarchy may be a file system having folders with folder paths corresponding to the plurality of different client-specific information combinations, and in which the data type information may correspond to a file type maintained within the folders.

The request handling component is part of a front-end data service that obtains the generalized data from a back-end data service. The system data type information may correspond to video data or a user interface data item. The associated data type information may correspond to a graph node data structure containing data that represents an interactive menu, or a graph node data structure containing data that represents an item of selectable content.

The associated client-specific information may include software version information and/or device type information. The associated client-specific information may include device class information or information from which a device class is determinable. The associated client-specific information may include client state data.

One or more aspects are directed towards receiving a request from a client device for data having associated data type information, in the request is associated with client-specific information, and obtaining generalized data corresponding to the requested data type. Described herein is determining if a data transformation pipeline (one or more transformation models) corresponding to the client-specific information and the data type exists, and if a data transformation pipeline does not exist, building the data transformation pipeline, in which each transformation model of the transformation pipeline corresponds to the client-specific information and the data type information. Further described herein is inputting the generalized data into the data transformation pipeline, receiving output data from the data transformation pipeline that is transformed by the one or more transformation models into customized data for the client device according to the client-specific information and returning the customized data in response to the client request.

Obtaining the generalized data may include communicating with a data service back-end, communicating with one or more data sources, and/or searching a cache of generalized data.

A hierarchy of transformation models may be maintained, in which the hierarchy is arranged according to combinations of client-specific information. Building the data transformation pipeline may include accessing the hierarchy of transformation models based upon the data type and the client client-specific information associated with the request to select at least one transformation model for the client request. Accessing the hierarchy of data structures may include building a path order in the hierarchy and searching via the path order until at least one transformation model is found that is a most specific transformation model available based upon the client-specific information. The type of the data item may be determined by matching an identifier of the data item to a regular expression.

One or more aspects are directed towards receiving a client request for a requested data item, in which the data item has an associated type and the client request is associated with client-specific information. Described herein is obtaining a transformation pipeline for the data type, in which the transformation pipeline contains one or more transformation models that correspond to the client-specific information. Upon obtaining the data item having data in a generalized form, further described herein is processing the data item through the transformation pipeline to obtain transformed data and returning the transformed data in response in response to the client request.

Obtaining the transformation pipeline may include determining if a transformation pipeline instance for the data type already exists that corresponds to the client-specific information, and if so, obtaining that transformation pipeline instance. If not, described herein building a pipeline instance for the data type, including locating one or more transformation models that correspond to the client-specific information.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles, and the like are contemplated for use in connection with various implementations including those exemplified herein. Servers including physical and/or virtual machines are likewise suitable devices. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
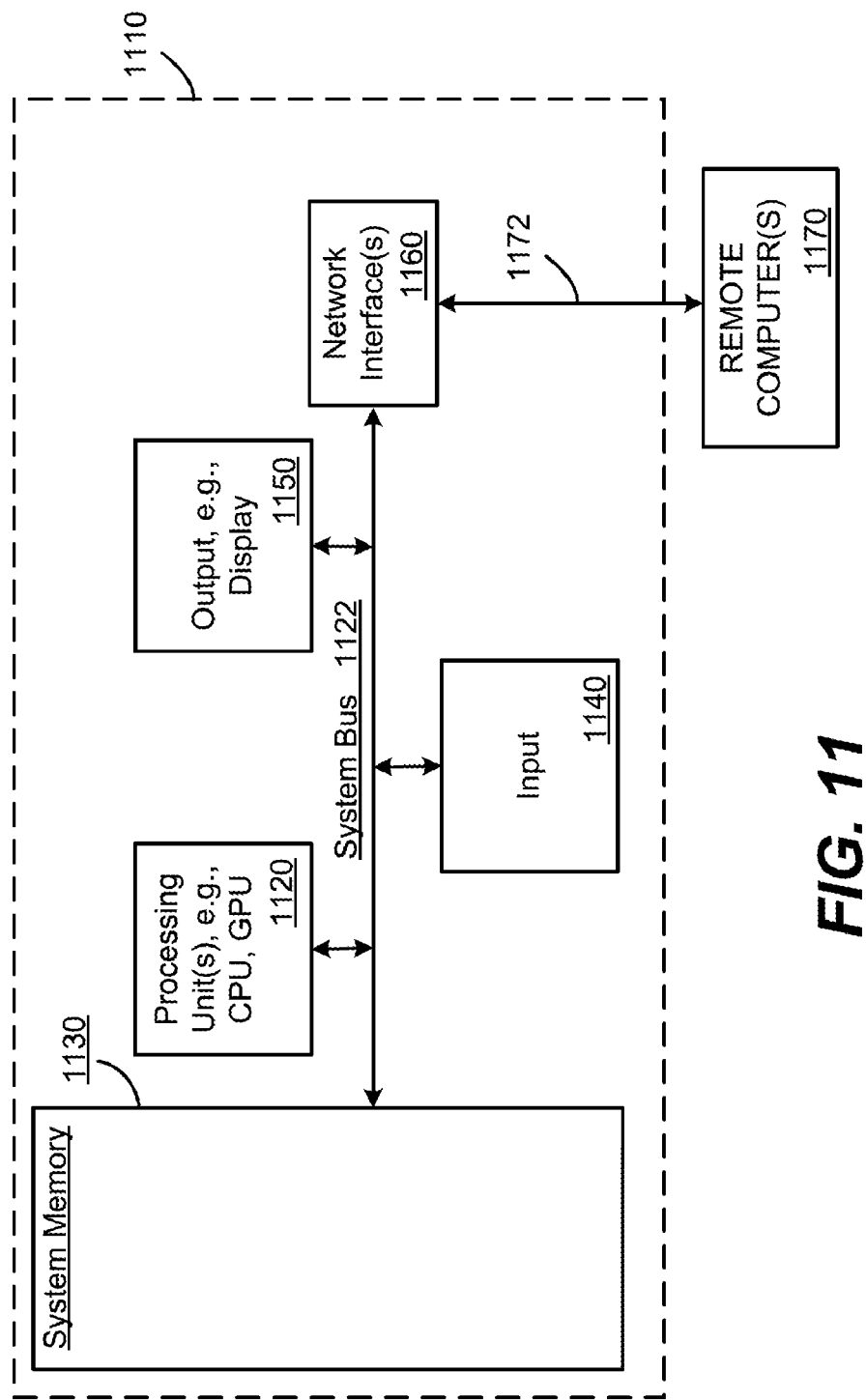
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system comprising,
    a request handling component that receives a request from a client device for data having associated data type information, and obtains generalized data corresponding to that request, the request having associated client-specific information;
    a data transformation pipeline comprising one or more transformation models, each transformation model in the data transformation pipeline corresponding to the client-specific information of the client device and the data type information, wherein the transformation models are maintained in a hierarchy arranged according to a plurality of different client-specific information combinations, and wherein the transformation pipeline is built for the client request by searching the hierarchy using the client-specific information associated with the request and the data type information associated with the request to select a subset of the transformation models in the hierarchy for the transformation pipeline; and
    the request handling component coupled to the data transformation pipeline to provide the generalized data for input into the data transformation pipeline, and to receive transformed output data from the data transformation pipeline, the transformed output data transformed by the one or more transformation models of the data transformation pipeline into customized data for the client device according to the client-specific information, and the request handling component configured to return the customized data in response to the client request.

2. The system of claim 1 wherein the data transformation pipeline comprises a template transformation model that formats data based upon the client-specific information, or shapes data based upon the client-specific information, or both formats and shapes data based upon the client-specific information.

3. The system of claim 1 wherein the transformation pipeline comprises a video transformation model, a template transformation model, a filtering transformation model, a namespace transformation model, a user state-based transformation model, a custom transformation model or a data expansion transformation model, or any combination of a video transformation model, a template transformation model, a filtering transformation model, a namespace transformation model, a user state-based transformation model, a custom transformation model or a data expansion transformation model.

4. The system of claim 1 wherein the transformation pipeline is maintained as a transformation pipeline instance that is useable for a plurality of client requests.

5. The system of claim 1, wherein the transformation pipeline is built with transformation models, in which based on the client-specific information and the data type information, a more-specific transformation model overrides a less-specific transformation model.

6. The system of claim 1, wherein the hierarchy comprises a file system having folders with folder paths corresponding to the plurality of different client-specific information combinations, and wherein the data type information corresponds to a file type maintained within the folders.

7. The system of claim 1 wherein the request handling component is part of a front-end data service, and wherein the request handling component obtains the generalized data from a back-end data service.

8. The system of claim 1 wherein the data type information corresponds to video data or corresponds to a user interface data item.

9. The system of claim 1 wherein the associated data type information corresponds to a graph node data structure containing data that represents an interactive menu, or a graph node data structure containing data that represents an item of selectable content.

10. The system of claim 1 wherein the associated client-specific information comprises device type information.

11. The system of claim 1 wherein the associated client-specific information comprises device class information or information from which a device class is determinable.

12. The system of claim 1 wherein the associated client-specific information comprises client state data.

13. A method comprising:
maintaining a hierarchy of transformation models, in which the hierarchy is arranged according to combinations of client-specific information;
receiving a request from a client device for data having associated data type information, the request associated with client-specific information;
obtaining generalized data corresponding to the requested data type;
determining if a data transformation pipeline comprising one or more transformation models corresponding to the client-specific information and the data type exists, and if a data transformation pipeline does not exist, building the data transformation pipeline comprising one or more transformation models, each transformation model of the transformation pipeline corresponding to the client-specific information and the data type information, wherein building the data transformation pipeline comprises accessing the hierarchy of transformation models based upon the data type and the client client-specific information associated with the request to select at least one transformation model for the client request;
inputting the generalized data into the data transformation pipeline;
receiving output data from the data transformation pipeline, the output data transformed by the one or more transformation models into customized data for the client device according to the client-specific information; and
returning the customized data in response to the client request.

14. The method of claim 13 wherein obtaining the generalized data comprises communicating with a data service back-end, communicating with one or more data sources, or searching a cache of generalized data, or any combination of communicating with a data service back-end, communicating with one or more data sources, or searching a cache of generalized data.

15. The method of claim 13, wherein accessing the hierarchy of data structures comprises building a path order in the hierarchy, and searching via the path order until at least one transformation model is found that is a most specific transformation model available based upon the client-specific information.

16. The method of claim 13 further comprising determining the type of the data item by matching an identifier of the data item to a regular expression.

17. One or more non-transitory machine-readable storage media having machine-executable instructions, which when executed perform operations, the operations comprising:
maintaining a hierarchy of transformation models, in which the hierarchy is arranged according to combinations of client-specific information;
receiving a client request for a requested data item, in which the data item has an associated type and the client request is associated with client-specific information;
obtaining a transformation pipeline for the data type, in which the transformation pipeline contains one or more transformation models that correspond to the client-specific information, wherein the obtaining the data transformation pipeline comprises accessing the hierarchy of transformation models based upon the data type and the client client-specific information associated with the request to select at least one transformation model for the client request;
obtaining the data item having data in a generalized form;
processing the data item through the transformation pipeline to obtain transformed data; and
returning the transformed data in response in response to the client request.

18. The one or more non-transitory machine-readable storage media of claim 17, wherein obtaining the transformation pipeline comprises determining if a transformation pipeline instance for the data type already exists that corresponds to the client-specific information, and if so, obtaining that transformation pipeline instance, and if not, building a pipeline instance for the data type, including locating one or more transformation models that correspond to the client-specific information.

19. The one or more non-transitory machine-readable storage media of claim 17, wherein the operations further comprise determining the type of the data item by matching an identifier of the data item to a regular expression.

20. The one or more non-transitory machine-readable storage media of claim 17, wherein the accessing the hierarchy of data structures comprises building a path order in the hierarchy, and searching via the path order until at least one transformation model is found that is a most specific transformation model available based upon the client-specific information.

* * * * *